(12) United States Patent
White, Jr.

(10) Patent No.: US 9,862,443 B2
(45) Date of Patent: Jan. 9, 2018

(54) BACKPACK FOR MOTORCYCLISTS

(71) Applicant: Melvin White, Jr., Simi Valley, CA (US)

(72) Inventor: Melvin White, Jr., Simi Valley, CA (US)

(*) Notice: Subject to any disclaimer, the term of this patent is extended or adjusted under 35 U.S.C. 154(b) by 8 days.

(21) Appl. No.: 14/754,529

(22) Filed: Jun. 29, 2015

(65) Prior Publication Data
US 2016/0375946 A1 Dec. 29, 2016

Related U.S. Application Data

(60) Provisional application No. 62/018,198, filed on Jun. 27, 2014.

(51) Int. Cl.
| | |
|---|---|
| *A45F 3/08* | (2006.01) |
| *A45F 3/04* | (2006.01) |
| *B62J 6/00* | (2006.01) |
| *A45C 15/00* | (2006.01) |
| *A45C 15/06* | (2006.01) |
| *B62J 6/04* | (2006.01) |
| *B60Q 1/34* | (2006.01) |

(Continued)

(52) U.S. Cl.
CPC ............... *B62J 6/003* (2013.01); *A45C 15/00* (2013.01); *A45C 15/06* (2013.01); *A45F 3/04* (2013.01); *B60Q 1/34* (2013.01); *B60Q 1/44* (2013.01); *B62J 6/005* (2013.01); *B62J 6/04* (2013.01); *G01S 19/13* (2013.01); *H02J 7/0003* (2013.01); *H02J 7/35* (2013.01); *A45F 2003/003* (2013.01); *B62J 2006/008* (2013.01)

(58) Field of Classification Search
CPC . A45C 15/06; A45F 4/02; A45F 4/023; B60Q 1/2673; B60Q 1/2676
See application file for complete search history.

(56) References Cited

U.S. PATENT DOCUMENTS

| | | | | |
|---|---|---|---|---|
| 2002/0030994 | A1* | 3/2002 | Krietzman | F21L 4/08 362/259 |
| 2002/0179653 | A1* | 12/2002 | Klamm | A45F 3/04 224/153 |

(Continued)

FOREIGN PATENT DOCUMENTS

| | | | | |
|---|---|---|---|---|
| CN | 203058634 U | * | 7/2013 | A45F 3/04 |
| CN | 203058643 U | * | 7/2013 | |

*Primary Examiner* — Andrew Coughlin
*Assistant Examiner* — Keith Delahoussaye
(74) *Attorney, Agent, or Firm* — Chen Huang; Adli Law Group P.C.

(57) ABSTRACT

A backpack for motorcyclists provides a rigid outer shell with an electrical system wherein an onboard battery powers rear signal lights, each comprising a plurality of light emitting diodes (LEDs), which are linked with the motorcycle's electrical system to function as brake lights and turn signals. The electrical system also charges a cellular telephone or other portable device via a Universal Service Bus (USB) port, and may be recharged by one or more solar panels mounted to the exterior of the backpack. A cellular telephone, music player, or similar device may also be connected via the USB port to play digital music files via speakers provided by the backpack, and a headphone socket is also provided. An onboard mapping device or homing beacon, enabled by the Global Positioning System (GPS), may be optionally provided.

8 Claims, 5 Drawing Sheets

(51) Int. Cl.
*B60Q 1/44* (2006.01)
*G01S 19/13* (2010.01)
*H02J 7/00* (2006.01)
*H02J 7/35* (2006.01)
*A45F 3/00* (2006.01)

(56) References Cited

U.S. PATENT DOCUMENTS

| | | | | |
|---|---|---|---|---|
| 2004/0235429 A1* | 11/2004 | Garavaglia | .......... | H04B 1/3822 |
| | | | | 455/90.1 |
| 2005/0140331 A1* | 6/2005 | McQuade | .............. | A45C 15/00 |
| | | | | 320/101 |
| 2013/0285802 A1* | 10/2013 | Juang | ......................... | B62J 3/00 |
| | | | | 340/432 |
| 2014/0061273 A1* | 3/2014 | Bullivant | .................. | A45F 3/04 |
| | | | | 224/576 |
| 2014/0140532 A1* | 5/2014 | Wang | ..................... | B60R 11/02 |
| | | | | 381/86 |

* cited by examiner

BACKPACK FOR MOTORCYCLISTS

CROSS-REFERENCE TO RELATED PATENT APPLICATIONS

Embodiments of the present invention relate to U.S. Provisional Application Ser. No. 62/018,198, filed Jun. 27, 2014, entitled "BACKPACK FOR MOTORCYCLISTS", the contents of which are incorporated by reference herein and which is a basis for a claim of priority.

BACKGROUND OF THE INVENTION

Field of the Invention

The invention relates generally to motorcycle equipment and accessories, and in particular to a backpack for motorcyclists. Compared to other drivers on the road, motorcyclists are especially vulnerable in a collision. They have no seat belts, shoulder harnesses, or air bags. Most importantly, they are not surrounded by two thousand pounds of steel. Despite their own precautions, motorcyclists still become involved in collisions with larger vehicles, most frequently being struck from behind, and the most frequent excuse offered by other drivers is that they didn't see the motorcycle. A backpack for motorcyclists, providing flashing turn signals and brake lights to increase visibility to other drivers in addition to other electrical functions, would resolve this problem.

SUMMARY OF THE DISCLOSURE

Accordingly, the invention is directed to a backpack for motorcyclists. The backpack provides a rigid outer shell with an electrical system wherein an onboard battery powers rear signal lights, each comprising a plurality of light emitting diodes (LEDs), which are linked with the motorcycle's electrical system to function as brake lights and turn signals. The electrical system also charges a cellular telephone or other portable device via a Universal Serial Bus (USB) port, and may be recharged by one or more solar panels mounted to the exterior of the backpack, by an outlet that plugs in to a power source or by an energy recovery device such as a mounted wind turbine that converts the spinning energy into useful electrical energy. A cellular telephone, music player, or similar device may also be connected via the USB port to play digital music files via speakers provided by the backpack, and a headphone socket is also provided. An onboard mapping device or homing beacon, enabled by the Global Positioning System (GPS), may be optionally provided.

Additional features may include lights on the front of the backpack on either the shoulder straps or on the top pack portion to help enhance riser visibility to other traffic.

Yet additional embodiments include the ability to have an internal gyroscope within the backpack that determines when a rider is leaning forward on the bike, or an accelerometer which may detect a speed change and deploys a spoiler from the back surface of the backpack which helps keep the rider down on the motorcycle.

Additional features and advantages of the invention will be set forth in the description which follows, and will be apparent from the description, or may be learned by practice of the invention. The foregoing general description and the following detailed description are exemplary and explanatory and are intended to provide further explanation of the invention.

BRIEF DESCRIPTION OF THE DRAWINGS

The accompanying drawings are included to provide a further understanding of the invention and are incorporated into and constitute a part of the specification. They illustrate one embodiment of the invention and, together with the description, serve to explain the principles of the invention.

DETAILED DESCRIPTION OF PREFERRED EMBODIMENTS

Figure 1:
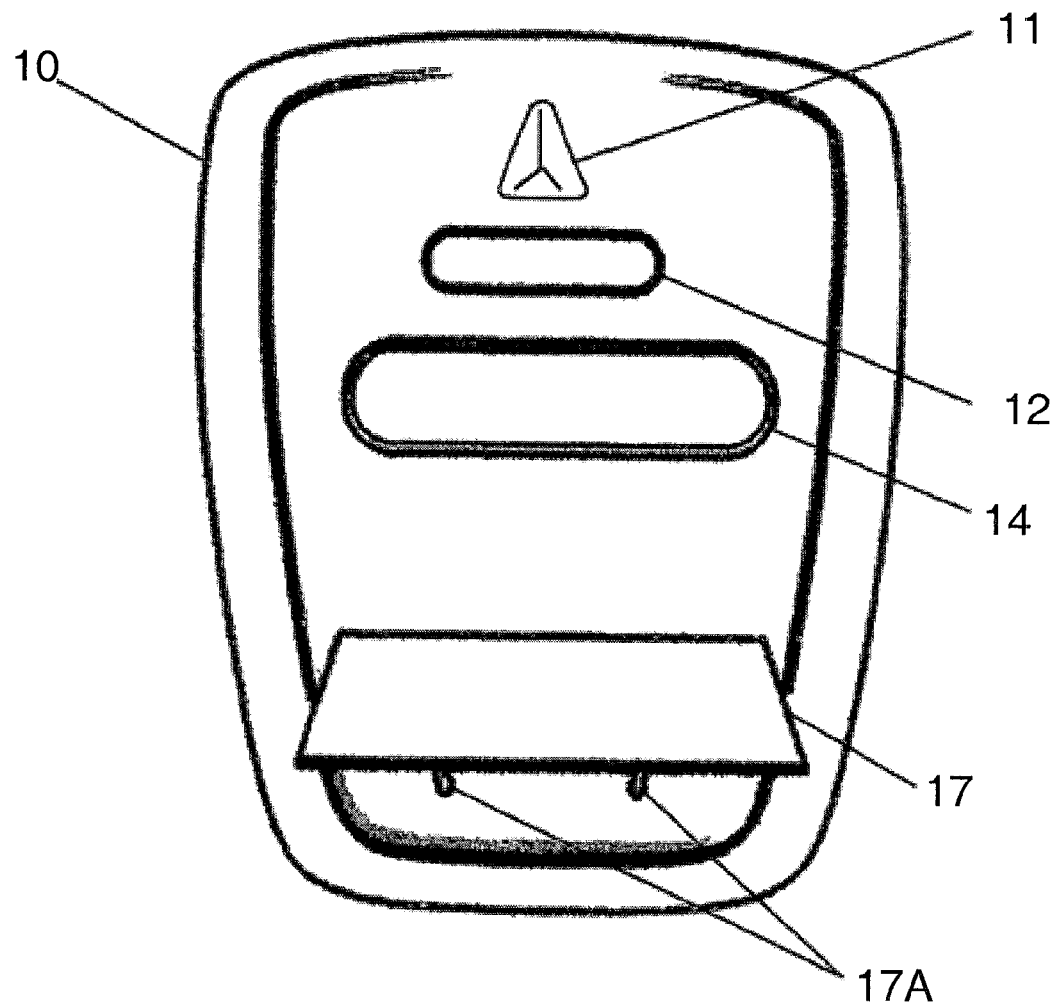
FIG. 1 is a rear view of a first exemplary embodiment, displaying the backpack 10, the antenna 11, the upper LED panel 12, the lower LED panel 14, the solar panel 17, and the frame 17A.
Figure 2:
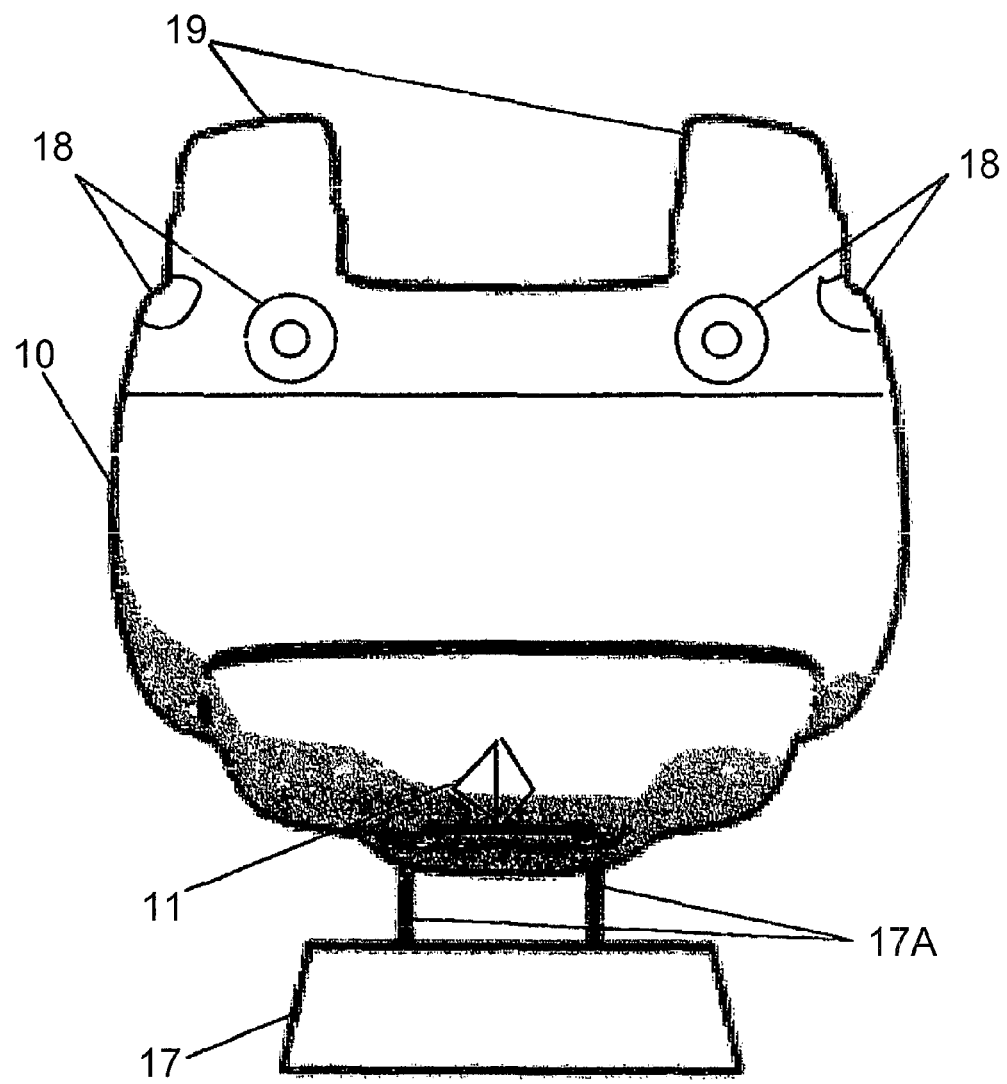
FIG. 2 is a top view of a first exemplary embodiment, displaying the backpack 10, the antenna 11, the solar panel 17, the frame 17A, the speakers 18, and the shoulder straps 19.
Figure 3:
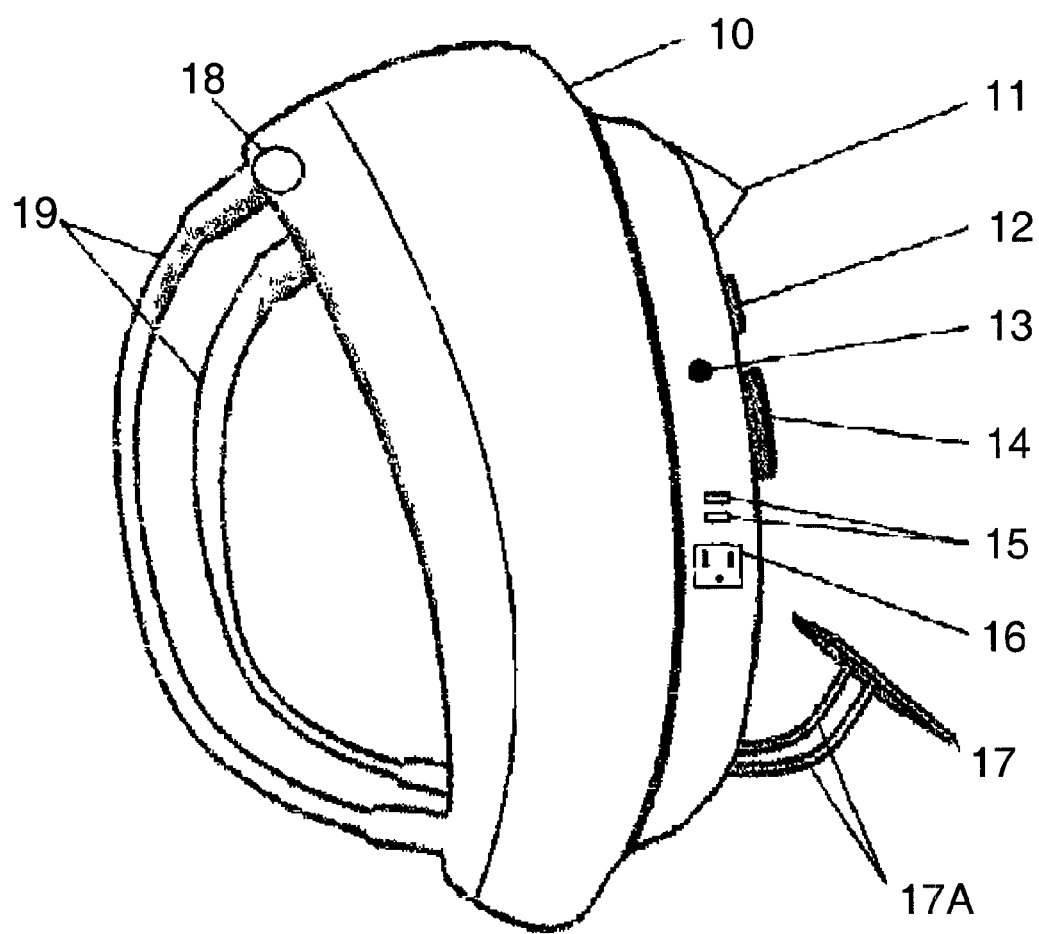
FIG. 3 is a side view of a first exemplary embodiment, displaying the backpack 10, the antenna 11, the upper LED panel 12, the headphone socket 13, the lower LED panel 14, USB ports 15, the power outlet 16, the solar panel 17, the frame 17A, the speakers 18, and the shoulder straps 19.

Referring now to the invention in more detail, the invention is directed to backpack 10 for motorcyclists. The backpack 10 provides a rigid outer shell with an electrical system wherein an onboard battery powers rear signal lights, each comprising a plurality of light emitting diodes (LEDs), which may be linked with the motorcycle's electrical system to function as brake lights and turn signals or independently as visually enhancing illumination to provide higher visibility of the rider. The electrical system also may charge a cellular telephone or other portable device via a Universal Serial Bus (USB) port 15, and may be recharged by one or more solar panels 17 mounted to the exterior of the backpack 10, or by a plug in outlet that can be plugged in to a regular electrical outlet to charge, or via an energy recapture device such as a wind turbine which generates electricity via motion from the wind when riding. A cellular telephone, music player, or similar device may also be connected via a USB port 15 to play digital music files via speakers 18 provided by the backpack 10, and a headphone socket 13 is also provided. An onboard mapping device or homing beacon, enabled by the Global Positioning System (GPS), may be optionally provided. Additionally an internal gyroscope and or accelerometer may reside within the backpack and deploys a spoiler upon the rider leaning forward and or accelerating to a higher speed or at a predetermined rate of acceleration.

It is to be understood that while the present invention is intended for use by motorcyclists, this is not intended as a limiting factor. With suitable modifications, the invention may be used by bicyclists and others who seek to provide a backpack mounted charging device and docking station for mobile electronic devices.

The invention is intended for installation as an aftermarket modification of the motorcycle by the user, or by a motorcycle repair or customizing shop. Alternate embodiments, intended for installation as original equipment by the manufacturer of the motorcycle, are contemplated.

The first exemplary embodiment provides a plurality of battery-powered LEDs contained in an upper LED panel 12 and a lower LED panel 14, which are preferably oval in shape, mounted on a rigid backpack 10 with two flexible shoulder straps 19. The upper LED panel 12 is preferably seven to eight inches in length, and the lower LED panel 14 is preferably nine to eleven inches in length. The LEDs in the lower LED panel 14 function as taillights and turn signals, and are large V-shaped devices. The LEDs 10 in the upper LED panel 12 function in the same manner as the third taillight mounted on most four-wheeled vehicles.

A control unit is provided, which is preferably mounted on the rear surface of the handlebars of the motorcycle. The control unit is preferably powered by direct connection to the electrical system of the motorcycle, and acquires signals from the motorcycle's electrical system which control the turn signals, taillights, and brake lights of the motorcycle. A transmitter in the control unit employs any one of several short-range wireless communications protocols, and is preferably a radio frequency (RF) transmitter, sending control signals to an RF receiver in the backpack 10. The transmitter may alternately employ a medium-range data transmission protocol such as Bluetooth™ to access a cellular telephone communications network. The control signals are received by an external antenna 11 mounted above the upper LED panel 12, which is preferably configured in a shark fin design. Alternate designs for the antenna 11, including an internal antenna configuration, are contemplated.

The control unit synchronizes the activation of the upper LED panel 12 and the lower LED panel 14 with the activation of the motorcycle's turn signals, taillights, and brake lights, and thereby causes the corresponding LEDs to flash on and off whenever a turn signal, taillight, or brake light is activated on the motorcycle. The LEDs may all be red in color, or they may be in coordinated or contrasting colors, such as red turn signals and blue taillights.

Additional electrical equipment for the backpack 10 is also provided. The left side surface of the backpack 10 provides a headphone socket 13, one or more USB ports 15, and a three-pronged power outlet 16, which is similar in appearance and function to an electrical wall outlet in a residence. The top and side surfaces of the backpack 10 also provide a plurality of speakers 18. A cellular telephone or similar mobile electronic device may be recharged by connecting it to one of the USB ports 15, which provides access to the onboard batteries. Digital music files may be acquired from a cellular telephone, digital music player, or similar device via a USB port 15, and played via the speakers 18, or the headphone socket 13.

The backpack 10 further provides an emergency beacon which operates based on location information from the Global Positioning System (GPS). An emergency signal button is provided which is recessed, covered by a removable cap, or otherwise protected to prevent accidental activation. When the emergency signal button is pressed, the backpack 10 transmits a GPS query via the antenna 11 to obtain location information, then transmits an emergency signal containing the location information obtained via the query. The emergency beacon may be used by a motorcyclist with a mechanical breakdown on the highway, or when hiking away from the road.

A solar panel 15, mounted on a retractable frame 17A, may be used to supply power directly to the upper LED panel 12, the lower LED panel 14, the USB ports 15, the transmitter, and the power outlet 16, which simultaneously recharging the onboard batteries. The solar panel 15 is preferably mounted on the rear surface of the backpack 10, below the lower LED panel 14.

Electronic components of the control unit preferably include a microprocessor, a memory device, an RF transmitter, an internal antenna, and an on/off switch. Electronic components of the backpack 10 preferably include an RF receiver, the antenna 11, the upper LED panel 12, the headphone socket 13, the lower LED panel 14, the USB ports 15, the power outlet 16, the solar panel 17, an on/off switch, a microprocessor, a memory device, and one or more replaceable batteries.

To use the first exemplary embodiment, the user puts on the backpack 10, and activates the on/off switches of the control unit and the backpack 10. The subsequent operation of the LEDs is automatically controlled by the control unit.

Other alternate embodiments are also contemplated. Additional LEDs, which may function as turn signals or running lights, may be affixed to the exterior surfaces of the backpack. This would improve visibility to other drivers approaching from the front and sides. The LEDs may be voice activated, with a microphone mounted on the exterior surface of the control unit and voice-to-text software installed on the memory device, such that bicyclists may use the invention. In such an embodiment the control unit would be battery-powered.

The backpack 10 is preferably manufactured from a rigid, durable material, such as fiberglass, acrylic polymer, aluminum alloy, or high-impact plastic. The antenna 11, the headphone socket 13, the USB ports 15, the power outlet 16, the frame 17A, the speakers 18, the microprocessor, and the memory device are preferably manufactured from rigid, durable materials such as steel and aluminum alloy. The upper LED panel 12 and the lower LED panel 14 are preferably manufactured from rigid. durable materials which are translucent, such as plastic and acrylic polymer.

The solar panel 17 is preferably a monocrystalline wafer manufactured from a rigid, durable material capable of photovoltaic effect, such as silicon. The shoulder straps 19 are preferably manufactured from a flexible, durable material such as nylon webbing. Components, component sizes, and materials listed above are preferable, but artisans will recognize that alternate components and materials could be selected without altering the scope of the invention.

Figure 4:
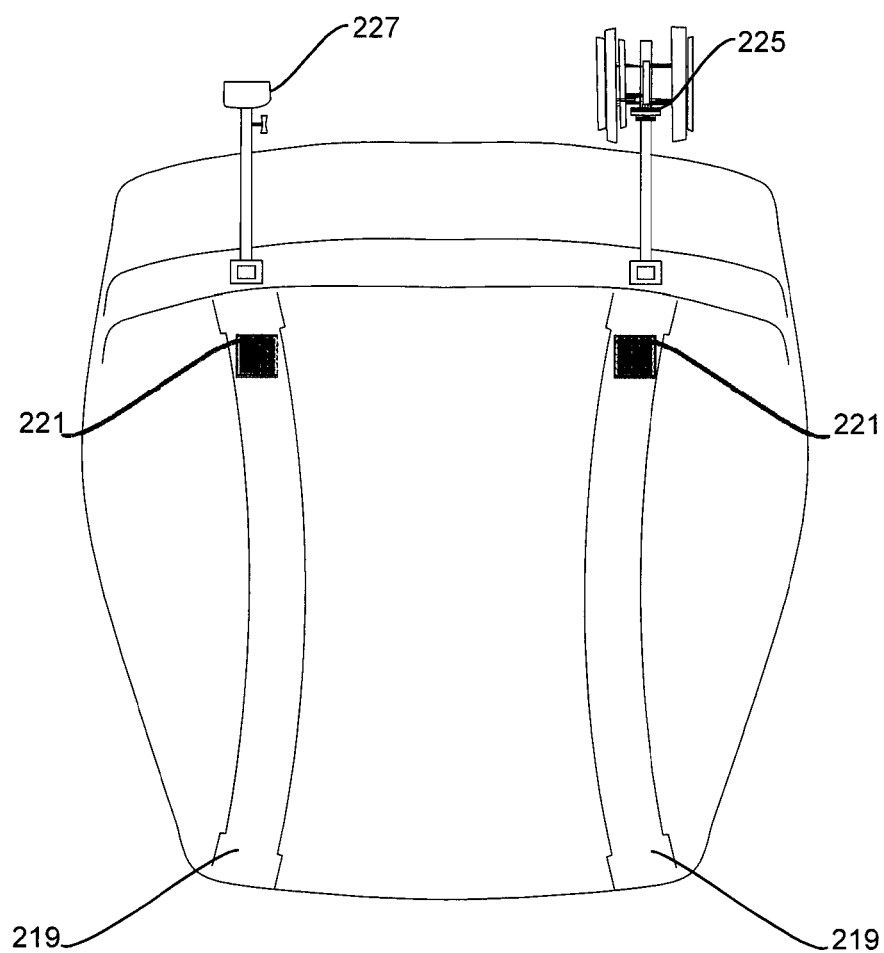
FIG. 4 is a front view of a second exemplary embodiment, displaying the backpack 210, with LED Lighting on the straps, a camera mount apparatus in the right shoulder region and a energy collector in the form of a wind turbine in the left shoulder region.

A second embodiment of the backpack 210 is depicted in FIG. 4 which shows a front view of an embodied backpack 210, with LED Lighting 221 on the straps 219, a camera mount apparatus 227 in the right shoulder region and a energy collector 225 in the form of a wind turbine in the left shoulder region. In this embodiment the Lighting 221 may be any type of lighting or reflective material as previously discussed and may be located anywhere along the backpack 210 as long as the lighting or reflective material provides enhanced visibility of the rider from oncoming traffic. The camera mount apparatus 227 may be located anywhere on the top of the backpack 210. The energy recapture apparatus 225 may also be located anywhere on the top of the back and may be any device that enables the conversion of wind energy to usable electrical energy capable of being stored in an internal battery or powering the embodiments including the Lighting, speakers, USB ports, MP3 players cell phones, navigation systems, GPS systems, gyroscopes, accelerometers, spoilers and/or antennas. The energy recapture apparatus 225 shown is in the form of a wind turbine but either wind type energy recapture devices are contemplated.

Figure 5:
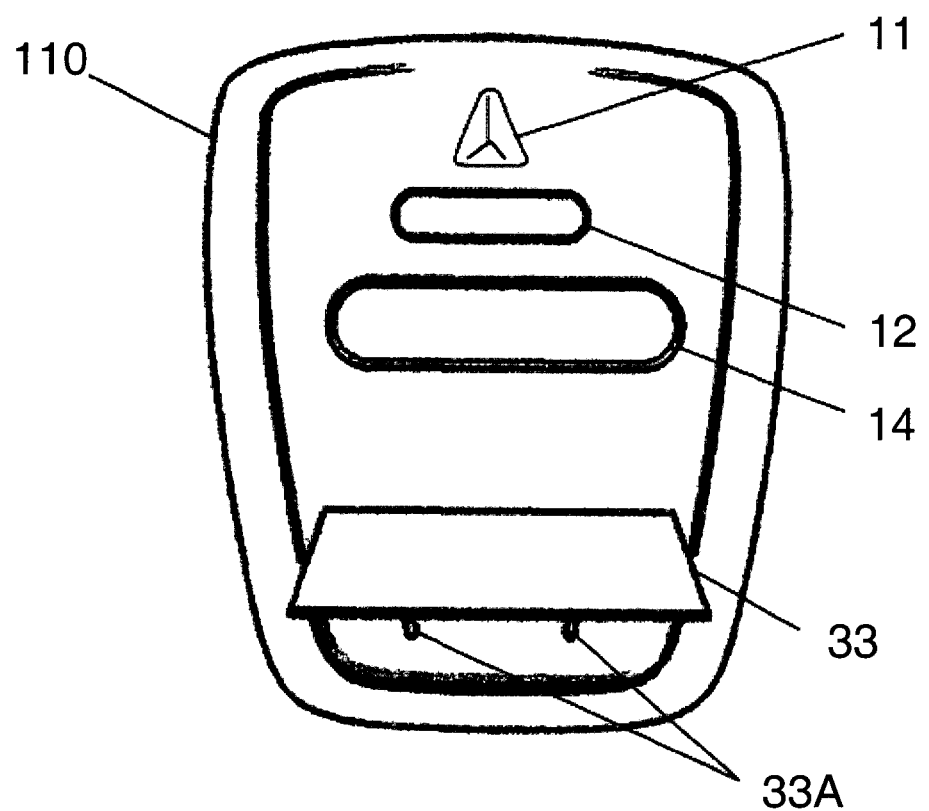
FIG. 5 is a rear view of a third exemplary embodiment, displaying the backpack 110, the antenna 11, the upper LED panel 12, the lower LED panel 14, a spoiler 33 and a spoiler frame 33A.

A third embodiment of the backpack 110 is depicted in FIG. 5 which shows a rear view of the backpack 110, the antenna 11, the upper LED panel 12, the lower LED panel 14, and a spoiler feature 33 and a spoiler frame 33A. The spoiler 33 is meant to elevate from the backpack 110 and provide more stability for the rider and the motorcycle similar to spoilers in race cars. An internal gyroscope or an accelerometer may determine when a rider is leaning forward on their bike and deploy the spoiler 33 upwards to engage the wind when moving and at an angle which allows for the wind hitting the spoiler 33 to provide a downward push of the rider on to the motorcycle to provide greater rider stability on the bike and rear-end stability of the motorcycle. The spoiler 33 may be fixed manually by the rider in a deployed position away from the backpack or a resting position against the back surface of the backpack by manipulating the spoiler frame 33A into an extended or retracted position. Additionally, the spoiler 33 may be deployed via an extension of the spoiler frame 33 based on the measurements of an internal gyroscope and or an internal accelerometer which deploys the spoiler based on one or more factors including: the body angle of the rider, the speed of the rider, or the acceleration rate of the rider. Additionally, the accelerometer and or gyroscope may be able to determine a rider accident and coordinate with the distress features to notify authorities to assist in the rescue of the rider.

While the foregoing written description of the invention enables one of ordinary skill to make and use what is presently considered to be the best mode thereof, those of ordinary skill in the art will understand and appreciate the existence of variations, combinations, and equivalents of the specific embodiment, method, and examples herein. The invention should, therefore, not be limited by the above described embodiment, method, and examples, but by all embodiments and methods within the scope and spirit of the invention.

What is claimed is:

1. A backpack for motorcyclists comprising:
a backpack with a rigid outer shell;
one or more rear signal lights on the rigid outer shell, each of the one or more rear signal lights comprise a plurality of light emitting diodes (LEDs), which are powered by a power supply and linked with a motorcycle's electrical system to function as brake lights and turn signals for the motorcycle;
two flexible shoulder straps for securing the backpack to a rider; and
a spoiler and spoiler frame.

2. The backpack of claim 1 further comprises at least one of an accelerometer and an internal gyroscope that determines when a rider is leaning forward on the user's motorcycle and deploys the spoiler.

3. The backpack of claim 1 further comprises a Universal Serial Bus (USB) port that allows a user to charge a cellular telephone or other portable device via the Universal Serial Bus (USB) port, where the Universal Serial Bus (USB) port is connected to an electrical system in the backpack.

4. The backpack of claim 1, further comprises one or more solar panels mounted to the spoiler of the backpack capable of recharging or assisting the power supply.

5. The backpack of claim 1 further comprises an onboard mapping device or homing beacon with Global Positioning System (GPS).

6. The backpack of claim 1 wherein the one or more rear signal lights include an upper LED panel and a lower LED panel.

7. The backpack of claim 1 further comprises a camera mount feature.

8. The backpack of claim 1 further comprises an internal antenna.

* * * * *